(12) United States Patent
Yang et al.

(10) Patent No.: US 8,665,772 B2
(45) Date of Patent: Mar. 4, 2014

(54) METHOD, DEVICE AND SYSTEM FOR TRANSMITTING A PUSH MESSAGE

(75) Inventors: Jian Yang, Shenzhen (CN); Shunan Fan, Shenzhen (CN); Lei Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 122 days.

(21) Appl. No.: 13/275,051

(22) Filed: Oct. 17, 2011

(65) Prior Publication Data

US 2012/0033605 A1  Feb. 9, 2012

Related U.S. Application Data

(63) Continuation of application No. PCT/CN2010/071791, filed on Apr. 15, 2010.

(30) Foreign Application Priority Data

Apr. 15, 2009 (CN) .......................... 2009 1 0134529

(51) Int. Cl.
*H04H 20/71* (2008.01)
*H04W 4/00* (2009.01)
*G06F 15/16* (2006.01)

(52) U.S. Cl.
USPC ............ 370/312; 370/338; 709/227; 709/229

(58) Field of Classification Search
None
See application file for complete search history.

(56) References Cited

U.S. PATENT DOCUMENTS

| 2002/0143897 | A1 | 10/2002 | Patil |
| 2006/0230154 | A1* | 10/2006 | Nguyenphu et al. .......... 709/227 |
| 2007/0136759 | A1* | 6/2007 | Zhang et al. .................... 725/62 |
| 2009/0047932 | A1* | 2/2009 | McNamara et al. .......... 455/411 |
| 2009/0077247 | A1* | 3/2009 | Bouazizi et al. .............. 709/229 |

FOREIGN PATENT DOCUMENTS

| CN | 101151918 A | 3/2008 |
| CN | 101227496 A | 7/2008 |
| CN | 101262630 A | 9/2008 |
| CN | 100442701 C | 12/2008 |
| CN | 101355720 A | 1/2009 |

OTHER PUBLICATIONS

Written Opinion of the International Searching Authority issued in corresponding PCT Patent Application No. PCT/CN2010/071791, mailed Jul. 22, 2010.
International Search Report issued in corresponding PCT Patent Application No. PCT/CN2010/071791, mailed Jul. 22, 2010.
Open Mobile Alliance, "Push Architecture" Draft Version 2.3, Mar. 2009. OMA-AD-Push-V2_3, with markups.

(Continued)

*Primary Examiner* — Brandon Renner
(74) *Attorney, Agent, or Firm* — Brinks Gilson & Lione

(57) ABSTRACT

In the field of wireless communications technologies, a method, a device and a system for transmitting a push message are provided, which solve the technical problem that a push message may not be transmitted in an appropriate Point To Multipoint (PTM) bearer mode in the prior art. The method includes: determining at least one mode in PTM bearer modes for a received push message; adapting respectively, for the push message, a transmission bearer type corresponding to the at least one mode; and transmitting the adapted push message to a terminal through a PTM bearer network corresponding to the transmission bearer type.

10 Claims, 8 Drawing Sheets

(56) References Cited

OTHER PUBLICATIONS

Open Mobile Alliance, "Push Architecture" Draft Version 2.3, Mar. 2009. OMA-AD-Push-V2_3.

Huawei, "Push Service of Point to Point Communication in a Mobile Network" Chinese Telecommunication Technical Report.
Office Action issued in corresponding Chinese Patent Application No. 200910134529.1, mailed Oct. 31, 2012.

* cited by examiner

METHOD, DEVICE AND SYSTEM FOR TRANSMITTING A PUSH MESSAGE

This application is a continuation of International Application No. PCT/CN2010/071791, filed on Apr. 15, 2010, which claims priority to Chinese Patent Application No. 200910134529.1, filed on Apr. 15, 2009, both of which are incorporated herein by references in their entireties.

FIELD OF THE INVENTION

The present invention relates to the field of wireless communications technologies, and in particular, to a method, a device and a system for transmitting a push message.

BACKGROUND OF THE INVENTION

The Point To Multipoint (PTM) bearer mode may refer to a broadcast or multicast mode. The application in push technologies is that, when target receiving ends of a push message transmitted by a push initiator (PI) at a network side are multiple terminals, a push server at the network side may transmit the push message in the PTM bearer mode, that is, the broadcast or multicast mode, so as to reduce the burden on the network side.

According to different broadcast and/or multicast technologies involved in the PTM bearer mode, the industry specifically defines the PTM bearer mode as the following modes: a Cell Broadcast Service (CBS) bearer mode corresponding to a CBS, a Multimedia Broadcast Multicast Service (MBMS) bearer mode corresponding to an MBMS, a Broadcast/Multicast Services (BCMCS) bearer mode corresponding to a BCMCS, and a mobile broadband digital broadcast/multicast service (Mobile Broadcast Service, BCAST) bearer mode corresponding to a mobile broadband digital broadcast/multicast service.

The push message of which the target receiving ends are multiple terminals may be transmitted to the multiple terminals in the PTM bearer mode, that is, one or more of the CBS bearer mode, the MBMS bearer mode, the BCMCS bearer mode and the BCAST bearer mode.

In the process of transmitting the push message through PTM bearer, the inventors find that the prior art at least has the following problems. Although the industry defines the modes applicable for PTM bearer such as the CBS bearer mode, the MBMS bearer mode, the BCMCS bearer mode and the BCAST bearer mode, the industry does not define the process of transmitting push messages for different uses by adopting an appropriate PTM bearer mode. Because each PTM bearer mode involves different technologies, and many technologies may provide the broadcast and multicast service, each PTM bearer mode must have a respective scenario or an application range for service implementation. However, the prior art fails to provide a process of transmitting a push message by adopting an appropriate PTM bearer mode when multiple PTM bearer modes coexist.

SUMMARY OF THE INVENTION

Embodiments of the present invention provide a method, a device and a system for transmitting a push message, which may transmit the push message through an appropriate PTM bearer mode.

In order to achieve the above objective, the embodiments of the present invention adopt the following technical solutions.

A method for transmitting a push message includes:
determining at least one mode in PTM bearer modes for a received push message;
adapting respectively, for the push message, a transmission bearer type corresponding to the determined at least one mode; and
transmitting the adapted push message to a terminal through a corresponding PTM bearer network, in which the bearer network recognizes the transmission bearer type of the adapted push message.

A method for receiving a push message includes:
receiving a push message from a PTM-push server through a PTM bearer network; and
adapting, for the received push message, a type recognizable by a PTM-push client.

A network device includes:
a bearer selection module, configured to determine at least one mode in PTM bearer modes for a received push message;
a bearer adaptation module, configured to adapt respectively, for the push message, a transmission bearer type corresponding to the at least one mode determined by the bearer selection module; and
a transmission module, configured to transmit the adapted push message to a terminal through a corresponding PTM bearer network, in which the bearer network recognizes the transmission bearer type of the adapted push message.

A terminal includes:
a receiving module, configured to receive a push message from a PTM-push server through a PTM bearer network; and
an adaptation module, configured to adapt, for the received push message, a type recognizable by a PTM-push client.

A system for transmitting a push message includes:
a PTM-push server, configured to determine at least one mode in PTM bearer modes for a received push message, adapt respectively, for the push message, a transmission bearer type corresponding to the determined at least one mode, and transmit the adapted push message to a terminal through a corresponding PTM bearer network, in which the bearer network recognizes the transmission bearer type of the adapted push message.

In the technical solutions according to the embodiments of the present invention, through the technical solution of selecting an appropriate PTM bearer mode for the received push message and configuring a corresponding transmission bearer type for the push message with the selected mode, the following problem is solved that the prior art fails to provide a process of transmitting a push message by adopting an appropriate PTM bearer mode when multiple PTM bearer modes coexist, which thereby achieves the technical effect of transmitting the push message through an appropriate PTM bearer mode.

BRIEF DESCRIPTION OF THE DRAWINGS

To illustrate the technical solutions according to the embodiments of the present invention or in the prior art more clearly, the accompanying drawings required for describing the embodiments or the prior art are introduced below briefly. Apparently, the accompanying drawings in the following descriptions merely show some of the embodiments of the present invention, and persons skilled in the art may obtain other drawings according to the accompanying drawings without creative efforts.

DETAILED DESCRIPTION OF THE EMBODIMENTS

Figure 10:
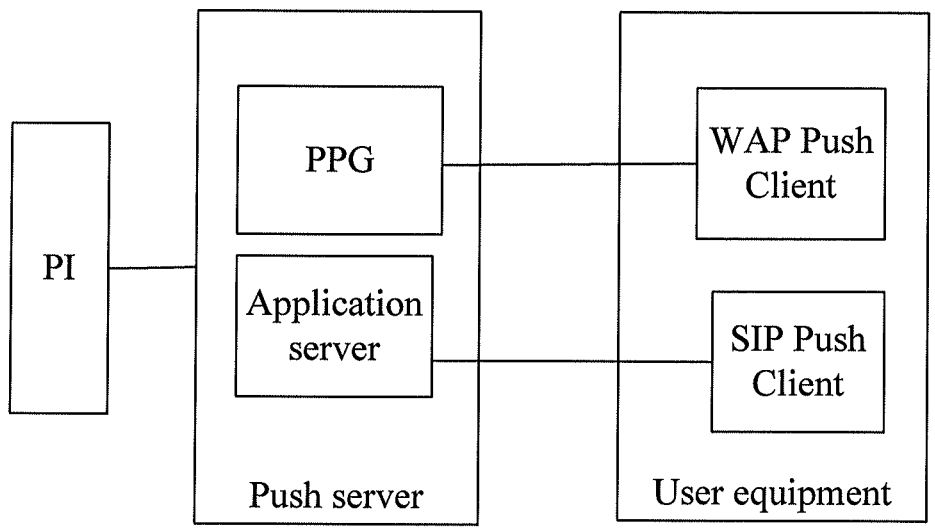
FIG. 10 is a schematic architecture diagram of a network for transmitting a push message in the prior art.

In the network architecture for transmitting a push message in the prior art, as shown in FIG. 10, a PI 00 transmits a received push message to a push server, the push server includes a push proxy gateway (PPG) 01 and an application server 02 that support a Point To Point (PTP) bearer mode, and the PPG 01 or the application server 02 performs corresponding processing on the push message according to an indication of a transfer bearer mode contained in the push message. The push message after being processed by the PPG 01 is transmitted to a Wireless Application Protocol push (WAP PUSH) client 03 in a user terminal for specified application processing; and the push message after being processed by the application server 02 is transmitted to a Session Initiation Protocol push (SIP PUSH) client 04 in the user terminal for specified application processing.

The technical solutions of the present invention are clearly and completely described in the following with reference to the accompanying drawings. It is obvious that the embodiments to be described are only a part rather than all of the embodiments of the present invention. All other embodiments obtained by persons skilled in the art based on the embodiments in this specification without creative effects shall fall within the protection scope of the present invention.

Embodiment 1

Figure 1:
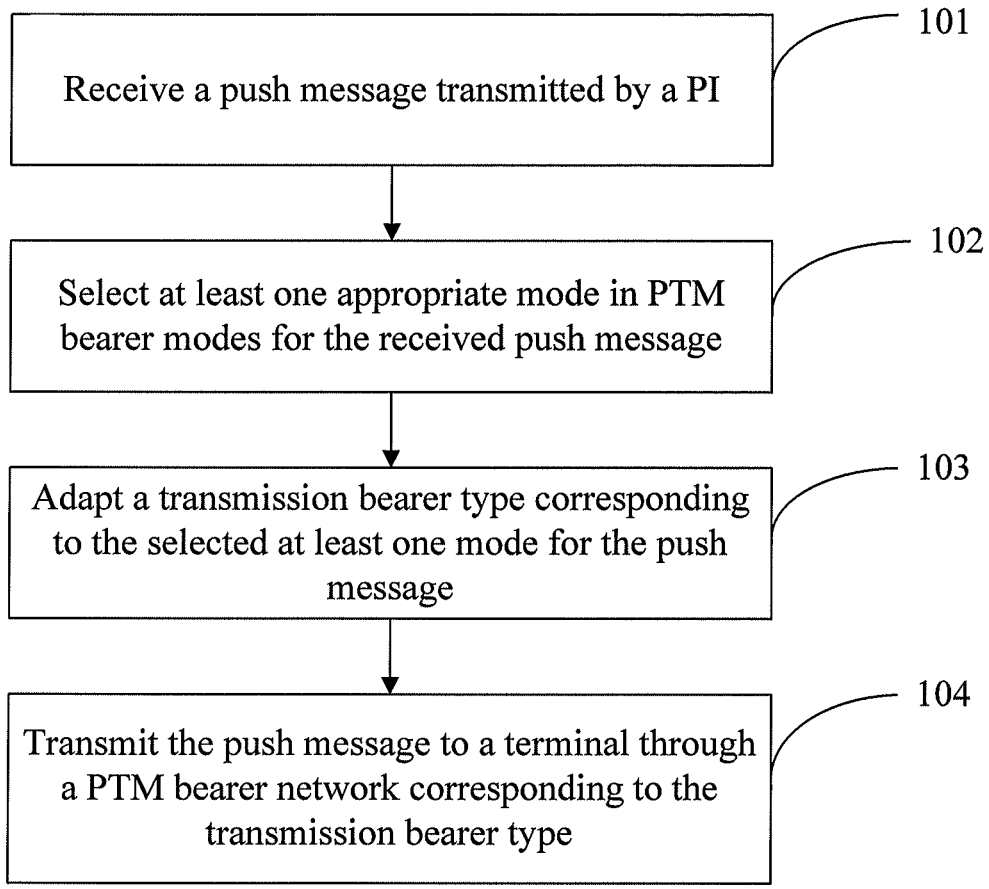
FIG. 1 is a flow chart of a method for transmitting a push message according to Embodiment 1 of the present invention.

This embodiment discloses a method for transmitting a push message, in which the method is applicable in a push server. As shown in FIG. 1, the method includes the following steps.

101: Receive a push message transmitted by a PI.

102: Determine at least one appropriate PTM bearer mode in PTM bearer modes for the received push message.

For example, the PI specifies that the push message is transferred by using a PTM bearer mode, but does not specify a specific PTM bearer mode, so the push server may select one or two appropriate PTM bearer modes in the modes such as CBS, MBMS, BCMCS, and BCAST for the received push message.

Or, the PI specifies a specific PTM bearer mode (at least one of CBS, MBMS, BCMCS, and BCAST), the push server may determine whether the specified mode is available, and if the specified mode is not available, the push server may select one or more appropriate PTM bearer modes in the modes such as CBS, MBMS, BCMCS, and BCAST for the received push message; or if the specified mode is available, the push server determines the specified mode as the specified bearer mode.

103: After the at least one appropriate mode is determined, adapt respectively, for the push message, a transmission bearer type corresponding to the determined at least one mode.

For example, if an appropriate PTM bearer mode A is determined in step 102, a transmission bearer type A1 corresponding to the selected mode A is adapted for the push message; or if two appropriate PTM bearer modes, namely, a mode B and mode C, are determined in step 102, the push message is replicated into two copies, a transmission bearer type B1 corresponding to the determined mode B is adapted for one copy, and a transmission bearer type C1 corresponding to the selected mode C is adapted for the other copy.

104: Transmit the adapted push message to a terminal through a PTM bearer network corresponding to the transmission bearer type.

For example, if a transmission bearer type A1 is adapted for the push message in 103, the push message is transmitted to a corresponding terminal through a PTM bearer network A1 corresponding to the transmission bearer type A1; or if two transmission bearer types B1 and C1 are adapted for the push message in 103, the push message is transmitted to a corresponding terminal through a PTM bearer network B1 corresponding to the transmission bearer type B1, and is transmitted to a corresponding terminal through a PTM bearer network C1 corresponding to the transmission bearer type C1.

Furthermore, it should be noted that the push server may select whether to notify the PI according to the determined PTM bearer mode. For example, if the PI specifies that it is required to return an acknowledgment message, when the PTM bearer type specified by the PI is not available, the push server, after selecting an appropriate PTM bearer mode for the PI, notifies the PI that the PTM bearer mode specified by the PI is not available, and may further notify the PI of the appropriate PTM bearer mode selected by the push server.

The solution according to this embodiment has the following beneficial effects. An appropriate PTM bearer mode may be determined for a push message, and a transmission bearer type corresponding to the selected mode may be configured for the push message after the mode is selected, so that the push message may be transmitted by using the selected appropriate mode.

Embodiment 2

Figure 11:
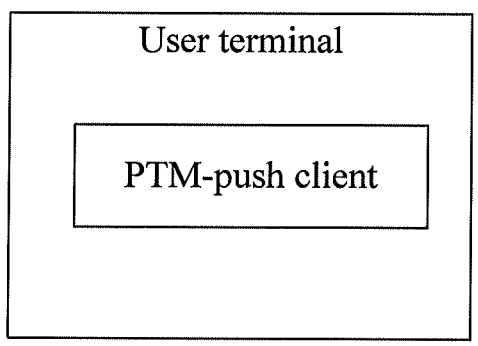
FIG. 11 is a schematic diagram of a user terminal according to Embodiment 2 of the present invention.

This embodiment provides a method for receiving a push message, in which the method is applicable in a user terminal. FIG. 11 is a schematic diagram of the user terminal. It may be known from FIG. 11 that, the user terminal includes a PTM-push client, and the PTM-push client may be a software module or physical hardware.

Figure 2:
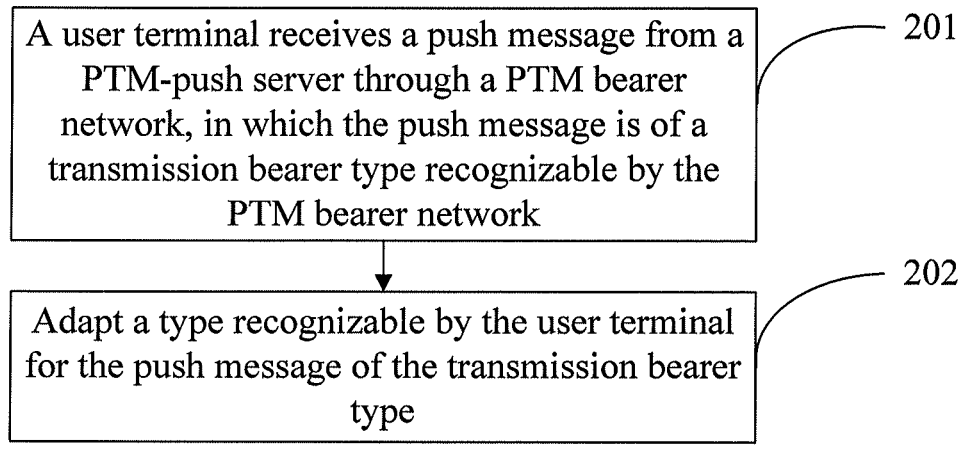
FIG. 2 is a flow chart of a method for transmitting a push message according to Embodiment 2 of the present invention.

As shown in FIG. 2, the method includes the following steps.

201: Receive a push message from a PTM-push server through a PTM bearer network, in which the type of the push message is a transmission bearer type recognizable by the PTM bearer network.

For example, the user terminal receives a push message from the PTM-push server through a CBS bearer network, and the type of the push message is a transmission bearer type recognizable by the CBS bearer network, that is, the push message is of a CBS transmission bearer type.

202: Adapt a type recognizable by the PTM-push client on the user terminal for the push message of the transmission bearer type.

For example, the push message of the CBS transmission bearer type is configured to be of a type recognizable by the user terminal.

In the prior art, a push message is directly transmitted to a push client (the push client may be a WAP-push client or an SIP-push client or a PTM-push client) by a push server, and no corresponding push message adaptation function is provided for the push message transmitted to the push client through the PTM bearer network. According to the embodiment of the present invention, the push message transmitted by the PTM bearer network is received, and the corresponding adaptation is completed for the PTM-push client, so that the PTM-push client is enabled to perform a function of further processing, which facilitates the transmission of the push message to the push client through the PTM bearer network.

Embodiment 3

The embodiment provides a method for transmitting a push message, in which the method involves a push server (the push server in this embodiment specifically refers to a PTM-push server) and a user terminal. In this embodiment, the push server supports four PTM bearer modes for a broadcast/multicast service. It is assumed that the four PTM bearer modes are a CBS bearer mode, an MBMS bearer mode, a BCMCS bearer mode and a BCAST bearer mode respectively, and accordingly, it is assumed that transmission bearer types corresponding to the four PTM bearer modes are a CBS transmission bearer type, an MBMS transmission bearer type, a BCMCS transmission bearer type and a BCAST transmission bearer type respectively, and accordingly, it is assumed that PTM bearer networks corresponding to the four transmission bearer types are a CBS bearer network, an MBMS bearer network, a BCMCS bearer network and a BCAST bearer network respectively. Accordingly, the user terminal in this embodiment also supports a function of receiving the push message from the PTM bearer network.

In this embodiment, step 302, step 303, step 304, and step 305 are fractionalized from step 102 in Embodiment 1; step 306 is fractionalized from step 103 in Embodiment 1; and step 307 is fractionalized from step 104 in Embodiment 1. Furthermore, step 301 to step 307 in this embodiment are steps of a method suitable for being deployed at the push server.

In this embodiment, step 308 is fractionalized from step 201 in Embodiment 2; and step 309 is fractionalized from step 202 in Embodiment 2. Furthermore, step 308 and step 309 in this embodiment are steps of a method suitable for being deployed at the user terminal.

Figure 3:
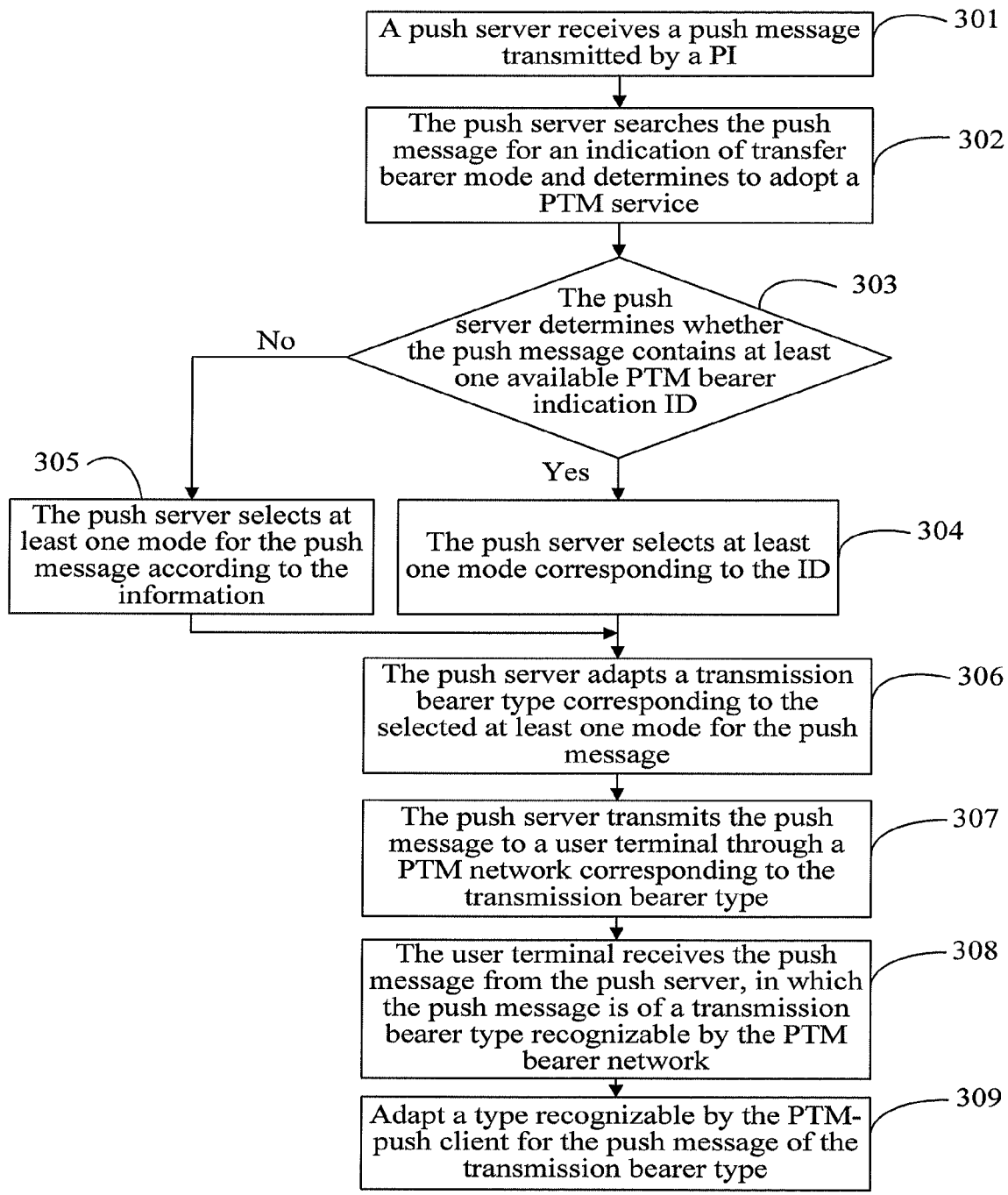
FIG. 3 is a flow chart of a method for transmitting a push message according to Embodiment 3 of the present invention.

As shown in FIG. 3, the method includes the following steps.

301: The push server receives a push message transmitted by a PI.

302: The push server searches the received push message to determine whether an indication of a transfer bearer mode used by the push message is contained. For example, an indication indicates that the push message needs to be transmitted by a PTP bearer mode (for example, Over The Air-Wireless Session Protocol (OTA-WSP), Over The Air-Hypertext Transfer Protocol (OTA-HTTP), and Over The Air-Session Initiation Protocol (OTA-SIP)) or by a PTM bearer mode.

In this embodiment, if the push server finds the indication of a transfer bearer mode, the push server determines the bearer mode required to be adopted according to the indication of the transfer bearer mode.

In this embodiment, it is assumed that the found indication of a transfer bearer mode is an indication of adopting a PTM bearer mode. The found indication of the transfer bearer mode includes: indicating to transmit the received push message by a PTM bearer mode, and at this time, the indication of the transfer bearer mode may be a PTM bearer mode identifier, or a URI (Universal Resource Identifier) address type suitable for broadcast or multicast, or a port number suitable for broadcast or multicast, or an IP (Internet Protocol) address type suitable for broadcast or multicast, or a network identification (ID) indicating a bearer network using the PTM bearer mode.

If the push server does not find the indication of a transfer bearer mode, the push server may determine, according to information such as the address type, a service that needs to be adopted for the push message. In this embodiment, it is assumed that the push server determines, according to the address type, that the push message needs to be transmitted by a PTM bearer mode.

303: The push server determines whether the push message contains at least one PTM bearer indication ID. The PTM bearer indication ID may be an indicator of CBS (or MBMS, or BCMCS, or BCAST), an address type suitable for broadcast or multicast of CBS (or MBMS, or BCMCS, or BCAST), a port number type suitable for broadcast or multicast of CBS (or MBMS, or BCMCS, or BCAST), or a CBS network ID or cell ID indicating to use a CBS bearer network. If the push server determines that at least one available PTM bearer indication ID is contained, the push server further determines whether the PTM bearer indication ID is an available ID, that is, whether a PTM bearer network indicated by the ID is available, and if the PTM bearer network is available, step 304 is performed; or if the PTM bearer network is not available, or the PTM bearer indication ID is not contained, step 305 is performed. Herein, the PTM bearer indication ID being "available" means that the PTM bearer network indicated by the PTM bearer indication ID supports the PTM bearer mode indicated by the PTM bearer indication ID. For example, the PTM bearer indicator is an address type suitable for CBS multicast, and the address type of CBS multicast indicates a CBS bearer network, and if the CBS bearer network supports a CBS multicast bearer mode, it indicates that the PTM bearer indication ID is available; or if the CBS bearer network only supports a CBS broadcast bearer mode, but does not support the CBS multicast bearer mode, it indicates that the PTM bearer indication ID is not available.

In this embodiment, the push server supports four PTM bearer modes, namely, the CBS, MBMS, BCMCS, and BCAST, and which PTM bearer mode is suitable for being adopted for the push message needs to be specifically determined after determining the push message is a push message that needs to be transferred by adopting a PTM bearer mode.

304: The push server selects a PTM bearer mode corresponding to the at least one PTM bearer indication ID, and step 306 is performed.

For example, if the push server determines that the address type of a target terminal is an address type of a cell broadcast CBS, the push server specifically selects the CBS mode to transmit the push message; or if the push server finds that the address type of the target terminal is a multicast address type, and the multicast address type also indicates the address type of MBMS, the push server specifically selects the MBMS mode to transmit the push message; or if the push server searches for an indicator or a tag, and the found indicator or tag indicates to transmit the push message by using the BCAST mode, the push server specifically selects the BCAST mode to transmit the push message; or the push server parses a Quality of Service (QoS) element in the message, or parses network parameters, or parses bearer network bearer parameters, and selects a corresponding transmission bearer type according to a parsing result, that is, a broadcast or multicast bearer network mode.

305: The push server selects at least one appropriate PTM bearer mode for the push message according to a property or information of the target terminal group and a property or information of a network side.

For example, the push server searches or queries information of the push server and/or other network devices, and a search or query result may include properties such as network condition, setting of a user terminal push service, setting of a PI side push service, and user online condition, and location information of the user terminal. The push server may select a specific PTM bearer mode for the push message according to the result.

The bearer network condition may refer to selecting an idle bearer network or an optimal bearer network, or selecting a bearer network that is used last time The setting of a user terminal push service may refer to preference setting information on a push service of a user, selecting a preferred PTM bearer network of the user, or selecting a corresponding PTM bearer network when the preferred push service content of the user is transmitted through a particular PTM bearer network.

The setting of a PI side push service may refer to a preferred PTM bearer network in QoS set by the PI or a particular PTM bearer network specified by the PI.

The user online condition may refer to selecting a PTM bearer network with more users online or selecting a PTM bearer network with some users offline.

The location information of the user terminal may refer to selecting a particular location, so as to transmit the push message to a user in this region through an appropriate transmission bearer type, or selecting an online user in a region, so as to transmit the push message to the online user in this region by selecting a transmission bearer type of the CBS multicast mode.

The process that the push server selects a specific PTM bearer mode for the push message according to the result may be as described in the following.

For example, the PI specifies that a push message of notifying to watch a sale promotion advertisement of a shopping mall A is pushed to users having subscribed to a mobile TV service around the shopping mall A through a multicast mode. Then, the push server determines that the push message may be transmitted through the MBMS or BCAST multicast bearer mode according to the multicast bearer modes indicated by the setting of a PI side push service. Then, the push server determines that the number of online BCAST users is large according to the online user condition of the mobile TV service, and the push server further determines to transmit the push message through the BCAST bearer mode, and specifies in the BCAST bearer mode that users under the BCAST bearer network around the shopping mall A may receive and parse the push message.

Furthermore, it should be noted that the push server may select, according to the determined PTM bearer mode, whether to notify the PI. For example, if the PI specifies that it is required to return an acknowledgment message, when the PTM bearer type specified by the PI is not available, the push server, after selecting an appropriate PTM bearer mode for the PI, notifies the PI that the PTM bearer mode specified by the PI is not available, and may further notify the PI of the appropriate PTM bearer mode selected by the push server.

Each PTM bearer mode corresponds to a transmission bearer type, and each transmission bearer type is suitable for a corresponding PTM bearer network for transmission. In this embodiment, four PTM bearer modes are provided, so after a specific PTM bearer mode is determined, a transmission bearer type corresponding to the determined PTM bearer mode needs to be configured for the push message. In this way, the push message may be transferred through a PTM bearer network corresponding to the determined bearer mode.

306: The push server adapts respectively, for the push message, a transmission bearer type corresponding to the selected at least one PTM bearer mode. That is, if two PTM bearer modes, namely BCAST and CBS, are selected, the corresponding BCAST transmission bearer type and CBS transmission bearer type are respectively adapted for the push message. As for the transmission bearer type corresponding to each selected mode, taking the situation that the selected PTM bearer mode is CBS as an example, the push server needs to perform the following configuration for the push message: converting a transfer mode of the push message into a transfer mode recognizable by CBS; and performing at least one of the following steps:

1: indicating a push application ID for pushing the push message to a PTM-push client through the PTM bearer network;

2: establishing, for the push message, a session link for the CBS;

3: converting an address type of the push message into an address type recognizable by the CBS; and 4: negotiating transmission channel parameters used in the transmission bearer of the push message, in which the transmission channel parameters include: parameters for establishing a transmission channel, parameters for modifying the transmission channel and parameters for releasing the transmission channel, and the transmission bearer channel matches the CBS.

For example, when the push server selects the CBS as the PTM bearer mode of the push message, accordingly, the push server configures a CBS transmission bearer type for the push message, and the specific configuration includes: configuring a transfer mode of the CBS for the push message (for example, configuring a format recognizable by the CBS and configuring a transmission format recognizable by an interface for transferring the configured push message), configuring, for the push message, a session link for the CBS, configuring, for the push message, an address type recognizable by the CBS, and configuring, for the push message, transmission channel parameters used in the transmission bearer of the CBS, in which the transmission channel parameters include: parameters for establishing a transmission channel, parameters for modifying the transmission channel and parameters for releasing the transmission channel, and the push server also needs to provide a push application ID indicating that the push message needs to be forwarded to a push client.

As an example, Table 1 lists contents to be configured when the push server configures the CBS transmission bearer type for the push message.

TABLE 1

| Value | Meaning |
|---|---|
| PUSH-CBS ID | Indicating to transmit the push message to a corresponding CBS bearer network |
| Source/destination port number address | Indicating a port number for receiving the push message |

TABLE 1-continued

| Value | Meaning |
| --- | --- |
| Serial connection ID | An ID indicating that the push message needs to be connected in series after being received by a terminal |
| Application ID | An application ID indicating that the message needs to be forwarded to a push client |
| Serial connection sequence number | Specific serial connection sequence number, for connecting received messages in series. |
| Content length | Indicating a length of data |
| Content type | Indicating a type of a message body |
| Message body | Content of push |

The list of contents to be configured in Table 1 is only a list for an embodiment of the present invention, but is not intended to limit the present invention, and during specific configuration, the push server may configure the contents listed in Table 1, or configure contents not contained in Table 1 for the push message according to requirements.

When the push server selects the MBMS, the BCMCS or the BCAST as the PTM bearer mode of the push message, similarly, the push server configures the MBMS, the BCMCS or the BCAST transmission bearer type for the push message accordingly, and the specific configuration contents are similar to those in configuring the CBS transmission bearer type, and persons skilled in the art can know how to configure the specific configuration contents for the corresponding configuration based on the foregoing description.

307: The push server transmits the configured push message to the user terminal through a PTM bearer network corresponding to the transmission bearer type by using a PTM interface, in which the PTM bearer network is a PTM bearer network that may transfer the push message.

For example, the push server configures the push message to be a push message for the CBS transmission bearer type, and transmits the push message to the user terminal through a CBS network by using a broadcast/multicast interface; or, the push server configures the push message to be a push message for the MBMS (or BCMCS or BCAST) transmission bearer type, and transmits the push message to the user terminal through an MBMS (or BCMCS or BCAST) network by using a broadcast/multicast interface. The PTM bearer network mentioned in step 307 is a collective term for the CBS network, the MBMS network, the BCMCS network and the BCAST network.

The PTM bearer network receives the push message, processes and forwards the push message, and then transmits the processed push message to the user terminal.

If the push message carries the destination port number information or the push application ID information defined in step 306, the PTM bearer network processes and forwards the received push message, and transmits the processed push message carrying the push relevant information to the user terminal. If the push message carries a push application ID, the PTM bearer network may further forward the push message to the PTM-push client according to the application ID, in which the application ID may indicate port information on the terminal, IP address information, or an application identifier of a corresponding client on the terminal.

308: The user terminal receives the push message from the push server through the PTM bearer network, in which the push message is of a transmission bearer type recognizable by the PTM bearer network.

For example, if the user terminal receives the push message from the push server through a CBS network, the push message is of a CBS transmission bearer type.

309: The user terminal adapts, for the push message of the transmission bearer type, a type recognizable by the PTM-push client. The specific adaptation process includes: converting a transfer mode of the push message into a transfer mode of the type recognizable by the PTM-push client, and performing at least one of the following steps:

1: converting an address type of the push message into an address type recognizable by the PTM-push client;

2: establishing, for the push message, a session link recognizable by the PTM-push client; and 3: negotiating transmission channel parameters used in the transmission bearer of the push message, in which the transmission channel parameters include: parameters for establishing a transmission channel, parameters for modifying the transmission channel and parameters for releasing the transmission channel, and the PTM-push client recognizes the transmission bearer channel.

For example, the push message of the CBS transmission bearer type is adapted to be of a type recognizable by the PTM-push client. The specific adaptation process includes: converting a transfer mode of the push message into a transfer mode of the type recognizable by the PTM-push client, and performing at least one of the following steps:

converting an address type of the push message into an address type recognizable by the PTM-push client;

establishing, for the push message, a session link recognizable by the PTM-push client; and negotiating transmission channel parameters used in the transmission bearer of the push message, in which the transmission channel parameters include: parameters for establishing a transmission channel, parameters for modifying the transmission channel and parameters for releasing the transmission channel, and the PTM-push client recognizes the transmission bearer channel.

Furthermore, the user terminal may also monitor the message transmitted to the user terminal, completes the receiving and adaptation of the push message, and transfers the adapted push message to the PTM-push client for further processing.

It should be noted herein that, the transfer of the push message is based on the situation that a connection between the PTM-push client and the PTM bearer network has been successfully established or no association needs to be established between the PTM-push client and the PTM bearer network, and when an association needs to be established, the processes of parameter negotiation and transmission channel establishment also need to be completed.

The PTM-push client receives the PTM configuration push message transmitted by the push server, in which the push message provides operation information such as indicating the PTM-push client to establish a connection or complete parameter negotiation with the PTM bearer network or trigger and activate the PTM bearer network to provide service transfer for the push message. For example, access parameter information is provided, according to which the PTM-push client establishes an association with the PTM bearer network, or provides indication information of activating the PTM network to monitor the push message transmitted by the push server.

The technical solution according to this embodiment has the following beneficial effects. A process of transmitting a push message by an appropriate PTM bearer mode when multiple PTM bearer modes coexist, which is not defined in the prior art, is provided in this embodiment, and a method for transmitting a push message through an appropriate PTM bearer mode is provided, and moreover, the process of transferring and adapting the push message between the PTM bearer network and the PTM-push client is provided in this embodiment.

Embodiment 4

Figure 4:
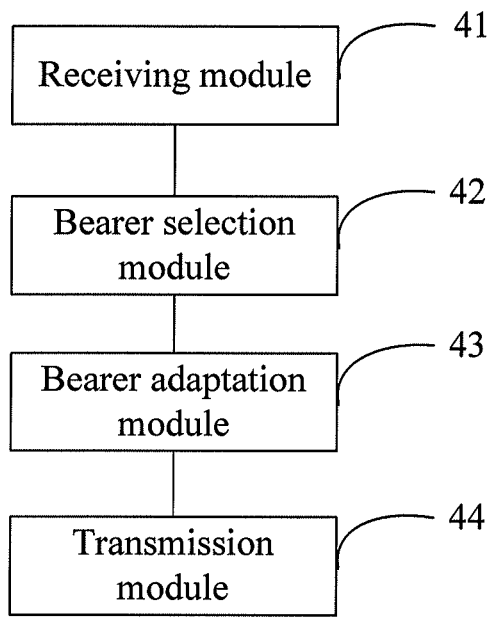
FIG. 4 is a structural block diagram of a network device according to Embodiment 4 of the present invention.

Corresponding to the method in Embodiment 1, this embodiment provides a network device, in which the network device may specifically be a push server. As shown in FIG. 4, the push server includes a receiving module 41, a bearer selection module 42, a bearer adaptation module 43, and a transmission module 44.

The receiving module 41 is configured to receive a push message transmitted by a PI. The bearer selection module 42 is configured to determine at least one mode in PTM bearer modes for the push message received by the receiving module 41. The bearer adaptation module 43 is configured to adapt respectively, for the push message, a transmission bearer type corresponding to the at least one mode selected by the selection module 42. The transmission module 44 is configured to transmit the adapted push message to a terminal through a PTM bearer network corresponding to the transmission bearer type.

The modules according to the embodiment of the present invention may be integrated, or deployed separately. The modules may be combined into one module, or further divided into multiple sub-modules.

The push server according to this embodiment has the following beneficial effects. The push server in this embodiment may select an appropriate PTM bearer mode for the received push message, and transmit the push message to the terminal according to the PTM bearer mode, which thereby achieves the beneficial effect of transmitting the push message through an appropriate transmission bearer mode.

Embodiment 5

Figure 5:
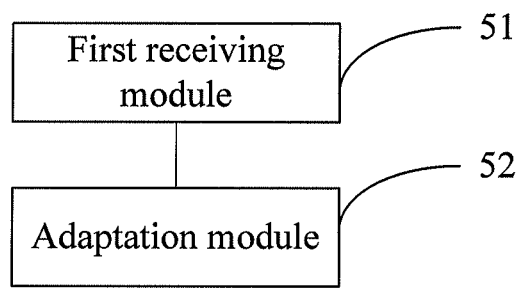
FIG. 5 is a structural block diagram of a user terminal according to Embodiment 5 of the present invention.

Corresponding to the method according to Embodiment 2, this embodiment discloses a user terminal. As shown in FIG. 5, the user terminal includes a first receiving module 51 and an adaptation module 52.

The first receiving module 51 is configured to receive a push message from a PTM-push server through a PTM bearer network, in which the push message is of a transmission bearer type recognizable by the PTM bearer network. The adaptation module 52 is configured to adapt a type recognizable by a PTM-push client for the push message of the transmission bearer type.

The user terminal according to this embodiment has the following beneficial effects. The received push message is adapted, so that the push message may be recognized by the user terminal, which facilitates the transfer of the push message to the user terminal through the PTM bearer network.

Embodiment 6

Figure 6:
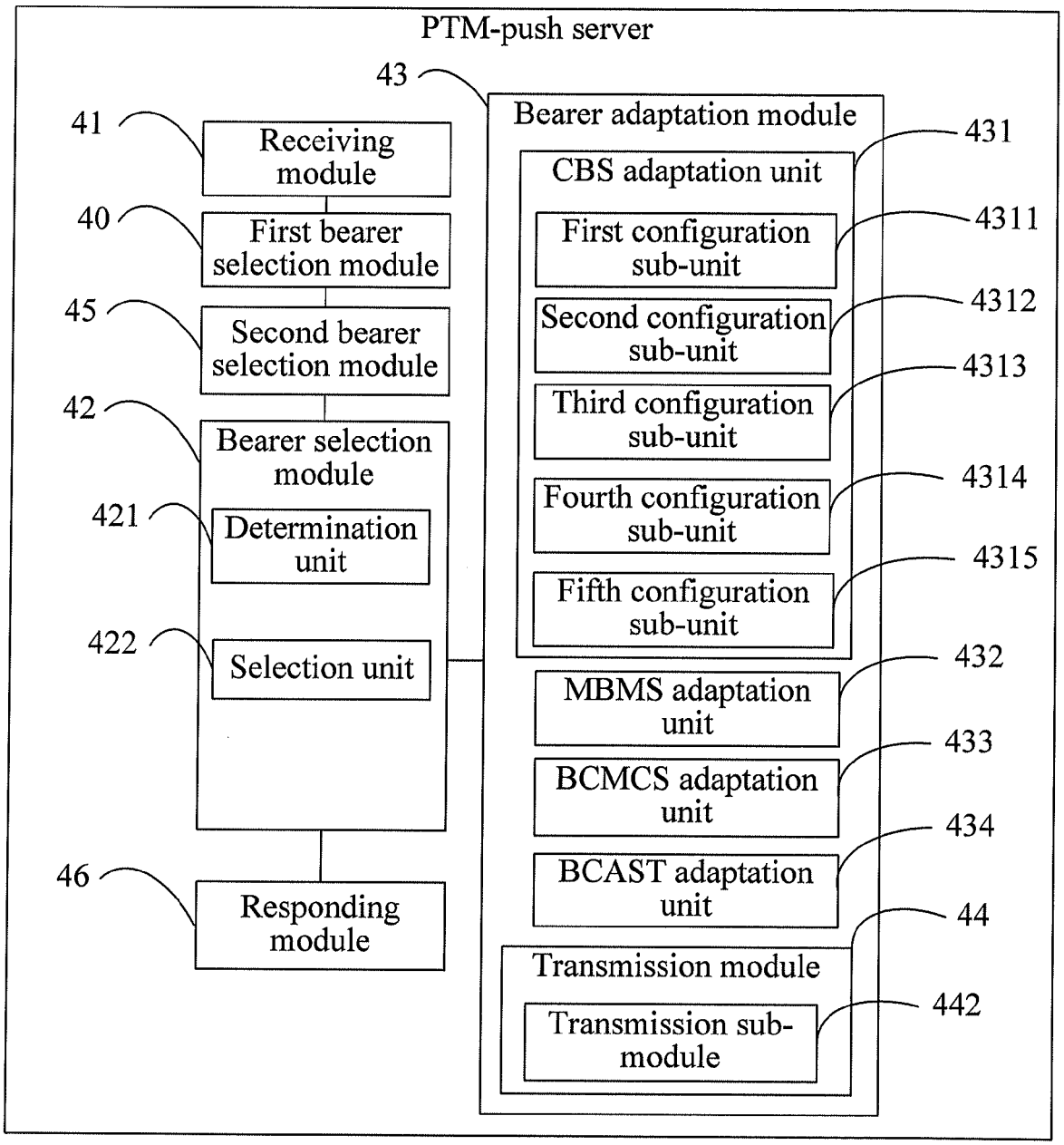
FIG. 6 is a structural block diagram of a push server according to Embodiment 6 of the present invention.

Corresponding to the method suitable for being deployed at a push server provided in Embodiment 3, this embodiment provides a network device, in which the network device is specifically a PTM-push server. As shown in FIG. 6, the PTM-push server includes a receiving module 41, a bearer selection module 42, a bearer adaptation module 43, and a transmission module 44.

Similar to Embodiment 4, the receiving module 41 is configured to receive a push message transmitted by a PI. The bearer selection module 42 is configured to determine at least one mode in PTM bearer modes for the push message received by the receiving module 41. The bearer adaptation module 43 is configured to adapt respectively, for the push message, a transmission bearer type corresponding to the at least one mode selected by the selection module 42. The transmission module 44 is configured to transmit the push message adapted by the bearer adaptation module 43 to a terminal through a PTM bearer network corresponding to the transmission bearer type.

Furthermore, compared with the network device in Embodiment 4, the network device in this embodiment further includes the following optional modules: a first bearer selection module 40, a second bearer selection module 45, and a responding module 46.

The first bearer selection module 40 is configured to determine that the push message is a push message that needs to be transmitted through a PTM bearer mode according to an indication of transfer bearer mode contained in the push message received by the receiving module 41. The second bearer selection module 45 is configured to determine that the push message is a push message that needs to be transmitted through a PTM bearer mode according to indication information such as an address type and bearer network indication information contained in the push message received by the receiving module 41; and after the first bearer selection module 40 or the second bearer selection module 45 determines that the push message is a push message that needs to be transmitted through a PTM bearer mode, at least one mode in PTM bearer modes is determined for the push message received by the receiving module 41. The responding module 46 is configured to transmit a response message carrying the at least one mode selected by the bearer selection module 42 to the PI.

A service indication contained in the push message received by the first bearer selection module 40 may be an address type of PTM.

The bearer selection module 42 in this embodiment further includes a determination unit 421 and a selection unit 422.

The determination unit 421 is configured to determine whether the push message contains at least one available PTM bearer indication ID. The selection unit 422 is configured to determine whether a PTM bearer mode indicated by the PTM bearer indication ID is available when the determination unit 421 determines that the push message contains at least one available PTM bearer indication ID, and select at least one mode according to the PTM bearer indication ID when the selection unit 422 determines that the PTM bearer mode is available; or select at least one PTM bearer mode according to a property or information of a target terminal group, and a property or information of a network side, when the selection unit 422 determines that the PTM bearer mode is not available or the determination unit 421 determines that the push message does not contain an available PTM bearer indication ID.

The contained PTM bearer indication ID determined by the determination unit 421 includes an indicator of the PTM bearer mode, or an address type suitable for broadcast or multicast, or a port number type suitable for broadcast or multicast.

Furthermore, the bearer adaptation module 43 in this embodiment includes a CBS adaptation unit 431, an MBMS adaptation unit 432, a BCMCS adaptation unit 433, and a BCAST adaptation unit 434.

The CBS adaptation unit 431 is configured to configure a CBS transmission bearer type for the push message with a mode selected by the bearer selection module 42. The MBMS adaptation unit 432 is configured to configure an MBMS transmission bearer type for the push message with a mode selected by the bearer selection module 42. The BCMCS adaptation unit 433 is configured to configure a BCMCS transmission bearer type for the push message with a mode selected by the bearer selection module 42. The BCAST adaptation unit 434 is configured to configure a BCAST transmission bearer type for the push message with a mode selected by the bearer selection module 42. Of course, the network device according to this embodiment may merely include one or several units of the adaptation units mentioned above, and may also include other adaptation units.

The bearer selection module 42 forwards the push message to the adaptation unit in the bearer adaptation module 43 that is corresponding to the mode according to the selected PTM bearer mode.

The CBS adaptation unit 431 in this embodiment includes a first configuration sub-unit 4311, a second configuration sub-unit 4312, a third configuration sub-unit 4313, a fourth configuration sub-unit 4314, and a fifth configuration sub-unit 4315.

The first configuration sub-unit 4311 is configured to convert a transfer mode of the push message to a transfer mode recognizable by the selected mode. The second configuration sub-unit 4312 is configured to indicate a push application ID for pushing the push message to a PTM-push client on a user terminal through a PTM bearer network for the push message. The third configuration sub-unit 4313 is configured to establish, for the push message, a session link for the selected mode. The fourth configuration sub-unit 4314 is configured to convert an address type of the push message into an address type recognizable by the selected mode. The fifth configuration sub-unit 4315 is configured to negotiate transmission channel parameters used in the PTM transmission bearer of the push message, in which the transmission channel parameters include: parameters for establishing a transmission channel, parameters for modifying the transmission channel and parameters for releasing the transmission channel, and the transmission bearer channel matches the selected mode.

It should be noted that, the CBS adaptation unit 431 in this embodiment includes the first configuration sub-unit 4311, the second configuration sub-unit 4312, the third configuration sub-unit 4313, the fourth configuration sub-unit 4314, and the fifth configuration sub-unit 4315. In another embodiment of the present invention, the CBS adaptation unit may not include all the configuration sub-units mentioned above, and may include the first configuration sub-unit 4311 and at least one of the other configuration sub-units.

Similarly, the MBMS adaptation unit 432, the BCMCS adaptation unit 433 and the BCAST adaptation unit 434 in this embodiment each include a first configuration sub-unit, a second configuration sub-unit, a third configuration sub-unit, a fourth configuration sub-unit and a fifth configuration sub-unit with the same functions as those of the configuration sub-units of the CBS adaptation unit 431.

Furthermore, the transmission module 44 in this embodiment includes a transmission sub-module 442.

The transmission sub-module 442 is configured to transmit the adapted push message to the PTM-push client on the user terminal through the PTM bearer network corresponding to the transmission bearer type adapted by the bearer adaptation module 43 by using a PTM interface.

The modules according to the embodiment of the present invention may be integrated, or deployed separately. The units may be combined into one unit, or further divided into multiple sub-units.

The PTM-push server according to this embodiment has the following beneficial effects. The PTM-push server may determine an appropriate PTM bearer mode for a push message, and adapt a corresponding transmission bearer type for the push message with a determined PTM bearer mode, so that the push message may be transmitted to the user terminal through an appropriate PTM bearer network.

Embodiment 7

Figure 7:
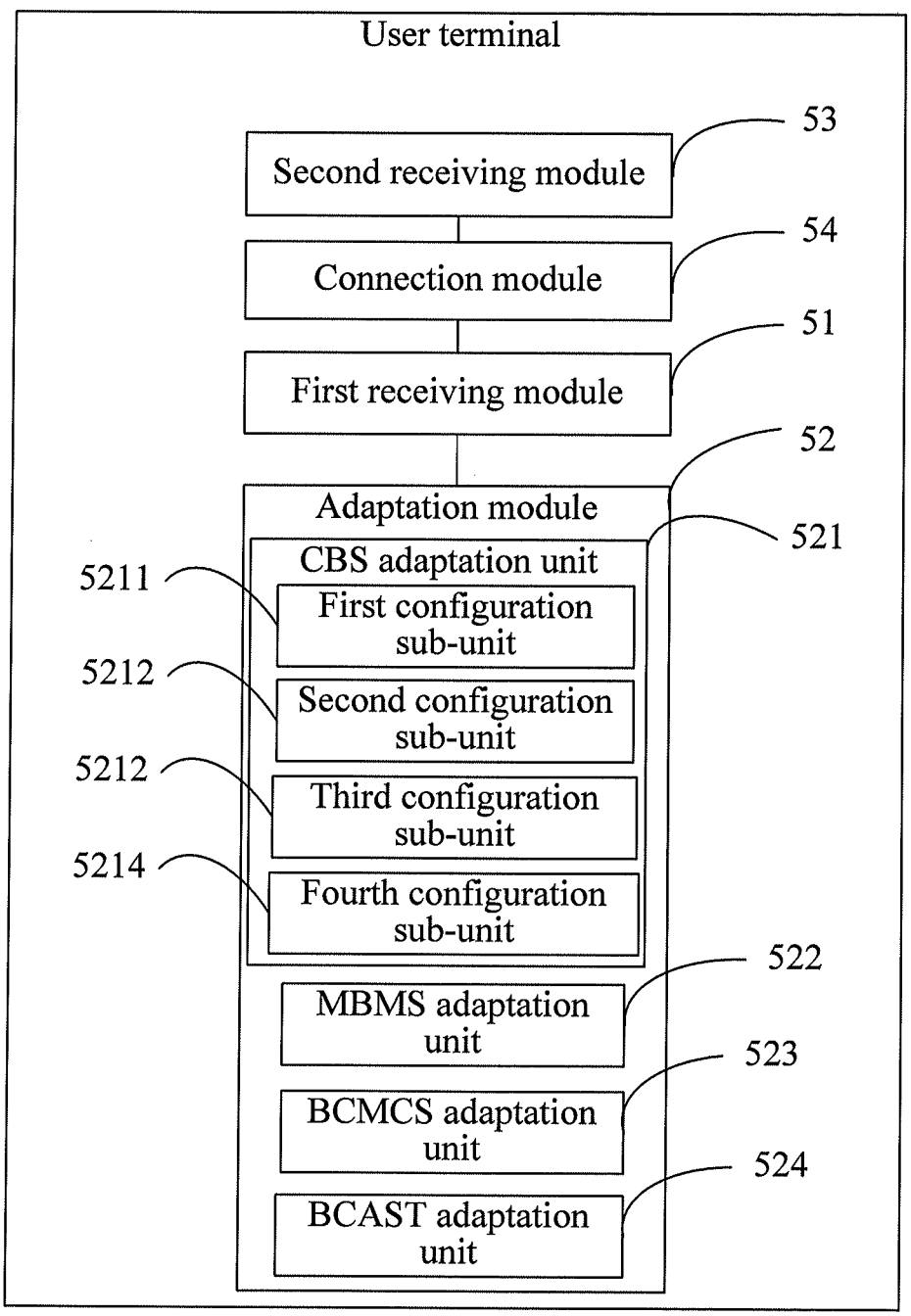
FIG. 7 is a structural block diagram of a terminal according to Embodiment 7 of the present invention.

Corresponding to the method suitable for being deployed at a user terminal provided in Embodiment 3, this embodiment provides a user terminal. As shown in FIG. 7, the user terminal includes a second receiving module 53, a connection module 54, a first receiving module 51, and an adaptation module 52. Compared with the user terminal in Embodiment 5, the second receiving module 53 and the connection module 54 in the user terminal according to this embodiment are optional modules.

The second receiving module 53 is configured to receive a PTM configuration push message from a push server, in which the PTM configuration push message contains parameters for connecting a PTM client and a PTM bearer network. The connection module 54 is configured to connect to the PTM bearer network according to the parameters. After the connection is established successfully, the receiving module 51 is configured to receive a push message from a PTM-push server through the PTM bearer network, in which the push message is of a transmission bearer type recognizable by the PTM bearer network. The adaptation module 52 is configured to adapt a type recognizable by a PTM-push client for the push message of the transmission bearer type.

Furthermore, the adaptation module 52 in this embodiment includes a CBS adaptation unit 521, an MBMS adaptation unit 522, a BCMCS adaptation unit 523, and a BCAST adaptation unit 524.

The CBS adaptation unit 521 is configured to configure the push message of the CBS transmission bearer type to be of a type recognizable by the PTM-push client. The MBMS adaptation unit 522 is configured to configure the push message of the MBMS transmission bearer type to be of a type recognizable by the PTM-push client. The BCMCS adaptation unit 523 is configured to configure the push message of the BCMCS transmission bearer type to be of a type recognizable by the PTM-push client. The BCAST adaptation unit 524 is configured to configure the push message of the BCAST transmission bearer type to be of a type recognizable by the PTM-push client.

The CBS adaptation unit 521 in this embodiment includes a first configuration sub-unit 5211, a second configuration sub-unit 5212, a third configuration sub-unit 5213, and a fourth configuration sub-unit 5214.

The first configuration sub-unit 5211 is configured to convert a transfer mode of the push message into a transfer mode recognizable by the PTM-push client. The second configuration sub-unit 5212 is configured to establish, for the push message, a session link used for the PTM-push client. The third configuration sub-unit 5213 is configured to convert an address type of the push message into an address type recognizable by the PTM-push client. The fourth configuration sub-unit 5214 is configured to negotiate transmission channel parameters used in the transmission bearer of the push message, in which the transmission channel parameters include parameters for establishing a transmission channel, parameters for modifying the transmission channel and parameters for releasing the transmission channel, and the PTM-push client recognizes the transmission bearer channel.

It should be noted that, the CBS adaptation unit 521 in this embodiment includes the first configuration sub-unit 5211, the second configuration sub-unit 5212, the third configuration sub-unit 5213, and the fourth configuration sub-unit 5214. In another embodiment of the present invention, the CBS adaptation unit may not include all the configuration sub-units mentioned above, and may include the first configuration sub-unit 5211 and at least one of the other configuration sub-units.

Similarly, the MBMS adaptation unit 522, the BCMCS adaptation unit 523 and the BCAST adaptation unit 524 in this embodiment each include a first configuration sub-unit, a second configuration sub-unit, a third configuration sub-unit and a fourth configuration sub-unit with the same functions as those of the configuration sub-units of the CBS adaptation unit 431.

The PTM-push client is a type of push client, and is configured to receive a push message transmitted through a PTM bearer network. A corresponding adaptation unit on the user terminal may be a functional unit on the PTM-push client, or a unit or a module on other functional units, and implements functions of receiving the push message transmitted through the PTM bearer network, and adapting the received push message to a push message recognizable and receivable by the PTM-push client, or implements a function of establishing the connection between the PTM-push client and the PTM bearer network.

For example, if a push message is transmitted through a CBS bearer network, a CBS port or a client on the user terminal forwards the received push message to a CBS adaptation unit on the terminal, in which the CBS adaptation unit may be a functional module of the PTM-push client, and the CBS adaptation unit completes the adaptation and transfers the adapted push message to the PTM-push client for processing.

The modules according to the embodiment of the present invention may be integrated, or deployed separately. The units may be combined into one unit, or further divided into multiple sub-units.

Compared with the user terminal in the prior art, the user terminal according to this embodiment is provided with an additional adaptation function, and may appropriately configure a type recognizable by a PTM-push client for a received push message.

Embodiment 8

Figure 8:
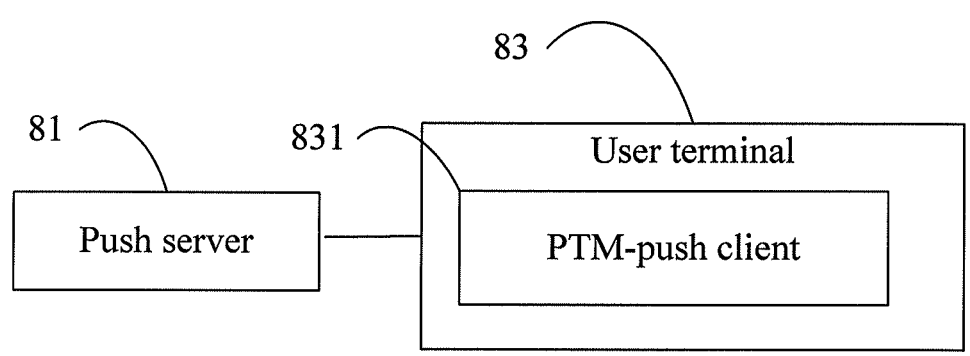
FIG. 8 is a structural block diagram of a system for transmitting a push message according to Embodiment 8 of the present invention.

This embodiment provides a system for transmitting a push message. As shown in FIG. 8, the system includes a PTM-push server 81.

The PTM-push server 81 is configured to determine at least one mode in PTM bearer modes for a received push message, adapt respectively, for the push message, a transmission bearer type corresponding to the determined at least one mode, and transmit the adapted push message to a user terminal through a PTM network corresponding to the transmission bearer type.

The system according to this embodiment adopts the technical solution of selecting and configuring a broadcast/multicast transmission bearer mode for a received push message, which can solve the problem that the prior art fails to provide a process of transmitting a push message by adopting an appropriate PTM bearer mode when multiple PTM bearer modes coexist, which thereby achieves the technical effect of transmitting the push message through an appropriate PTM bearer mode.

Embodiment 9

Figure 9:
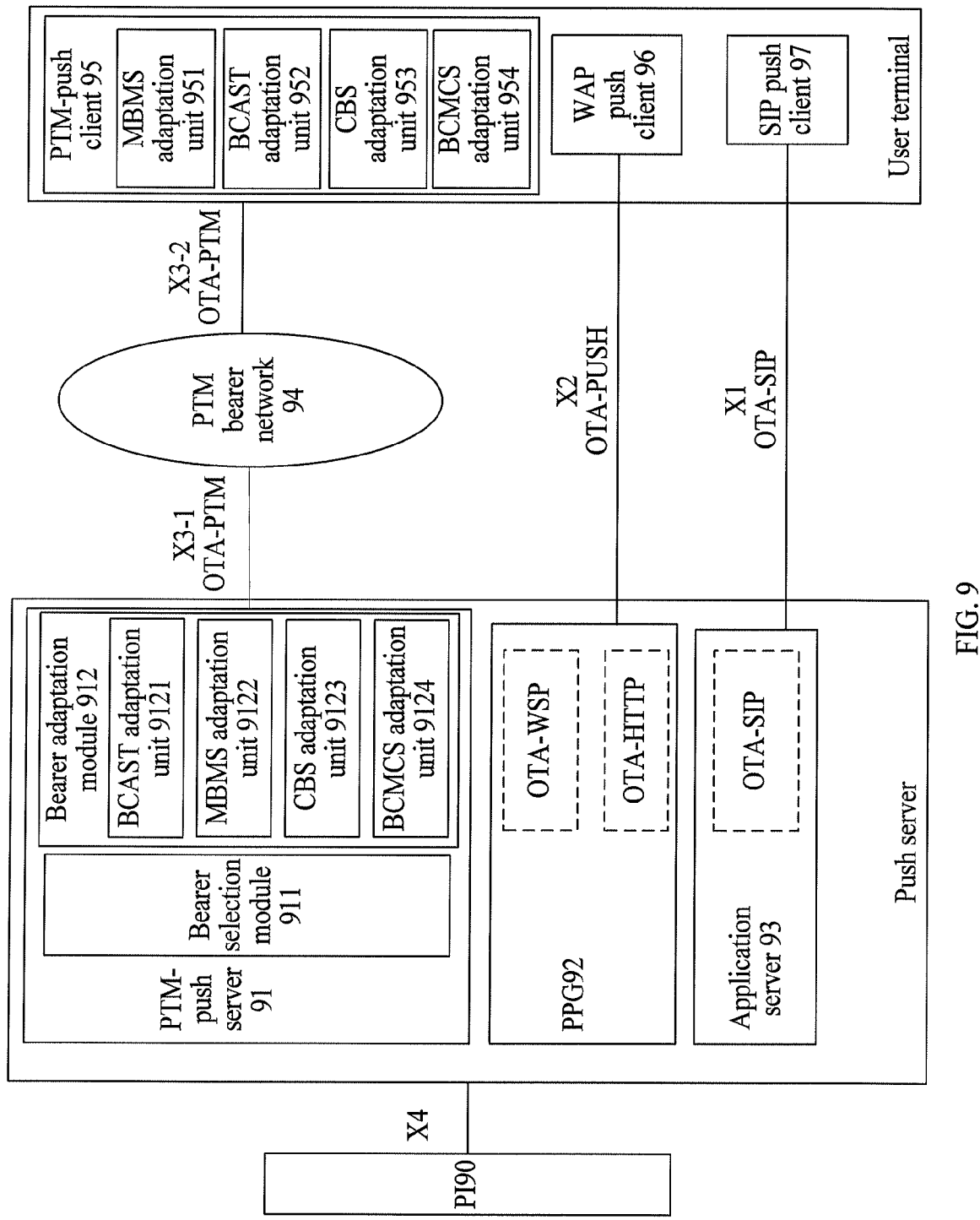
FIG. 9 is a structural block diagram of a system for transmitting a push message according to Embodiment 9 of the present invention.

Next, as a typical example of the system embodiment, a system for transmitting a push message is described. As shown in FIG. 9, the system includes a PI 90, a PTM-push server 91, a PPG 92, and an application server 93.

The PI 90 is configured to transmit a push message to a push server.

In this embodiment, the PTM-push server 91, the PPG 92 and the application server 93 are all push servers.

The PPG 92 is configured to receive the push message transmitted by the PI 90, process the push message supporting an OTA-WSP and an OTA-HTTP, and transmit the processed push message to a WAP push client 96 through an interface X-2 supporting an OTA-push protocol.

The application server 93 is configured to receive the push message transmitted by the PI 90, process the push message supporting an OTA-SIP, and transmit the processed push message to an SIP push client 97 through an interface X1 supporting the OTA-SIP.

The PTM-push server 91 is configured to introduce a PTM bearer mode, and adopt the introduced PTM bearer mode to process the push message from the PI 90, and transmit the processed push message to a PTM bearer network 94 through an X3-1 interface supporting an OTA-PTM protocol. The processing includes transmitting, by the PTM-push server 91, a PTM configuration message to a PTM-push client 95, in which the PTM configuration message contains parameters for establishing connection between the PTM-push client 95 and the PTM bearer network 94.

Furthermore, the PTM-push server 91 in this embodiment includes a bearer selection module 911 and a bearer adaptation module 912. The PTM-push server 91 is a push server or a functional module on a push server.

The bearer selection module 911 is configured to determine whether the push message from the PI 90 is a push message that needs to be transmitted through a PTM bearer mode, select at least one appropriate PTM transmission bearer mode for the push message after determining that the push message is a push message that needs to be transmitted through a PTM bearer mode, and transmit the push message after selecting at least one mode to the bearer adaptation module 912. The bearer adaptation module 912 is configured to appropriately configure the received push message, so that the push message may be transmitted through a mode selected by the bearer selection module 911.

Furthermore, the bearer adaptation module 912 in this embodiment includes a BCAST adaptation unit 9121, an MBMS adaptation unit 9122, a CBS adaptation unit 9123, and a BCMCS adaptation unit 9124.

The BCAST adaptation unit 9121 is configured to configure a BCAST transmission bearer type for the push message. The MBMS adaptation unit 9122 is configured to configure an MBMS transmission bearer type for the push message. The CBS adaptation unit 9123 is configured to configure a CBS transmission bearer type for the push message. The BCMCS adaptation unit 9124 is configured to configure a BCMCS transmission bearer type for the push message.

The bearer selection module 911 transmits the push message after selecting a mode to a corresponding adaptation sub-unit in the bearer adaptation module 912.

The system according to this embodiment may further include: a PTM bearer network 94, a PTM-push client 95, a WAP push client 96, and an SIP push client 97. The PTM-push client 95 is located at a user terminal.

The PTM bearer network 94 is configured to receive a push message from the PTM-push server 91 through an X3-1 interface supporting the OTA-PTM protocol, process the push message, and transfer the processed push message to the PTM-push client 95 through an X3-2 interface supporting the OTA-PTM protocol.

The PTM-push client 95 is configured to receive a PTM configuration push message from the PTM-push server 91 through the PTM bearer network 94, or receive a PTM configuration push message from the PTM-push server 91 for configuring access of the PTM-push client 95 to the PTM bearer network. The PTM configuration push message contains parameters for connecting to the PTM bearer network 94. The PTM-push client 95 is further configured to connect to the PTM bearer network 94 according to the parameters, and after the connection is successfully established, receive the push message from the PTM-push server 91 through the PTM bearer network 94. The push message is of a transmission bearer type recognizable by the PTM bearer network 94 and a type recognizable by the PTM-push client 95 is adapted for the push message of the transmission bearer type.

The PTM-push client 95 includes an MBMS adaptation unit 951, a BCAST adaptation unit 952, a CBS adaptation unit 953, and a BCMCS adaptation unit 954.

The MBMS adaptation unit 951 is configured to adapt the received push message of the MBMS transmission bearer type to be of a type recognizable by the PTM-push client 95. The BCAST adaptation unit 952 is configured to adapt the received push message of the BCAST transmission bearer type to be of a type recognizable by the PTM-push client 95. The CBS adaptation unit 953 is configured to adapt the received push message of the CBS transmission bearer type to be of a type recognizable by the PTM-push client 95. The BCMCS adaptation unit 954 is configured to adapt the received push message of the BCMCS transmission bearer type to be of a type recognizable by the PTM-push client 95.

The adaptation for the received push message by each adaptation unit includes: converting a transfer mode of the push message into a transfer mode of the type recognizable by the PTM-push client 95; converting an address type of the push message into an address type recognizable by the PTM-push client 95; establishing a session link recognizable by the PTM-push client 95 for the push message; and negotiating transmission channel parameters used in transmission bearer of the push message, in which the transmission channel parameters include: parameters for establishing a transmission channel, parameters for modifying the transmission channel and parameters for releasing the transmission channel, and the PTM-push client 95 recognizes the transmission bearer channel.

The PTM-push client 95 is a push client for receiving the push message transmitted through the PTM bearer network 94, and may be an individual push client, such as a WAP push client or an SIP push client.

The PTM bearer network 94 may be a network formed by the PTM server and the PTM client, or a bearer network for transferring a message point-to-multipoint.

The WAP push client 96 is configured to receive and process the push message from the PPG 92 and/or the PTM-push client 95.

The SIP push client 97 is configured to receive and process the push message from the application server 93 and/or the PTM-push client 95.

The specific example of the system for transmitting a push message according to this embodiment defines a process of transmitting a push message by adopting an appropriate PTM bearer mode when multiple PTM bearer modes coexist which is not provided in the prior art, which thereby achieves the technical effect of transmitting a push message through an appropriate PTM bearer mode.

The embodiments of the present invention are mainly used in the field of wireless communications technologies, and definitely may be applied in other scenarios in the field with the development of network technologies, and may also be applied in the fields of similar technologies.

Through the above description of the implementation, it is clear to persons skilled in the art that the present invention may be accomplished through software plus a necessary universal hardware platform, or through hardware, in which the former implementation method is better in many cases. Based on this understanding, the technical solutions of the present invention or the part that makes contributions to the prior art may be substantially embodied in the form of a software product. The computer software product is stored in a readable storage medium such as a floppy disk, a magnetic disk or an optical disk, and contains several instructions to instruct a network server to perform the method described in the embodiments of the present invention.

Obviously, persons skilled in the art may make various alternations, modifications, and combinations to the embodiments of the present invention without departing from the spirit and scope of the present invention. In this way, if the alternations and modifications made to the embodiments of the present invention are within the protection scope of the claims of the present invention and equivalent techniques, the embodiments of the present invention are intended to include the alternations, modifications and combinations.

The above descriptions are merely specific embodiments of the present invention, but are not intended to limit the present invention. Any modification or replacement that may be easily thought of by persons skilled in the art without departing from the technical scope of the present invention shall fall within the protection scope of the present invention. Therefore, the protection scope of the present invention is subject to the scope of the appended claims.

What is claimed is:

1. A method for transmitting a push message, comprising:
   determining at least one mode in Point To Multipoint (PTM) bearer modes for a received push message;
   configuring, for the push message, a transmission bearer type corresponding to the at least one mode; and
   transmitting the push message through a PTM bearer network corresponding to the transmission bearer type;
   wherein determining the at least one mode in the PTM bearer modes for the received push message comprises:
   determining whether the push message comprises at least one PTM bearer indication identification (ID);
   if the push message comprises at least one PTM bearer indication ID, determining whether a PTM bearer mode indicated by the PTM bearer indication ID is available; and
   if the PTM bearer mode indicated by the PTM bearer indication ID is available, determining at least one PTM bearer mode according to the PTM bearer indication ID.

2. The method for transmitting a push message according to claim 1, wherein the PTM bearer modes comprise:
   a Cell Broadcast Service (CBS) bearer mode, a Multimedia Broadcast Multicast Service (MBMS) bearer mode, a Broadcast/Multicast Services (BCMCS) bearer mode, and a Mobile Broadcast Service, (BCAST) bearer mode.

3. The method for transmitting a push message according to claim 1, wherein transmitting the push message through the PTM bearer network corresponding to the transmission bearer type comprises:
   transmitting the push message to a PTM-push client on a terminal through the PTM bearer network corresponding to the transmission bearer type by using a PTM adaptation interface on a PTM-push server.

4. The method for transmitting a push message according to claim 3, wherein the PTM bearer network corresponding to the transmission bearer type is capable of recognizing the transmission bearer type of the push message, and the PTM bearer network comprises at least one of:
a CBS bearer network, a MBMS bearer network, a BCMCS bearer network, and a BCAST bearer network.

5. The method for transmitting a push message according to claim 1, wherein determining the at least one mode in the PTM bearer modes for the received push message comprises:
determining whether the push message comprises at least one PTM bearer indication ID;
if the push message comprises at least one PTM bearer indication ID, determining whether a PTM bearer mode indicated by the PTM bearer indication ID is available; and
if the push message does not comprise a PTM bearer indication ID or the PTM bearer mode indicated by the PTM bearer indication ID is not available, selecting at least one mode according to target terminal group information and/or network side information.

6. The method for transmitting a push message according to claim 1, wherein the PTM bearer indication ID comprises at least one of: an indicator of the PTM bearer mode, an address type suitable for broadcast or multicast, a port number type suitable for broadcast or multicast, and a network ID indicating a bearer network using the PTM bearer mode.

7. The method for transmitting a push message according to claim 6, wherein the indicator of the PTM bearer mode comprises at least one of the an indicator indicating transmission using a PTM mode, an indicator indicating transmission using a broadcast or multicast mode, an indicator indicating transmission using CBS, an indicator indicating transmission using a MBMS, an indicator indicating transmission using BCMCS, and an indicator indicating transmission using a BCAST.

8. The method for transmitting a push message according to claim 1, wherein one determined mode corresponds to one transmission bearer type, and configuring the transmission bearer type corresponding to the determined mode for the push message comprises:
converting a transfer mode of the push message into a transfer mode recognizable by the determined mode, and performing at least one of:

(1) indicating a push application ID for pushing the push message to a PTM-push client through the PTM bearer network;
(2) establishing, for the push message, a session link for the determined mode;
(3) converting an address type of the push message into an address type recognizable by the determined mode; and
(4) negotiating transmission channel parameters used in the PTM transmission bearer of the push message, wherein the transmission channel parameters comprise: parameters for establishing a transmission channel, parameters for modifying the transmission channel and parameters for releasing the transmission channel, and the transmission bearer channel matches the determined mode.

9. The method for transmitting a push message according to claim 1, further comprising:
transmitting a response message carrying the determined at least one mode to a push initiator (PI).

10. A non transitory computer-readable storage medium including instructions to instructions for a processor to instruct a network server to perform:
determining at least one mode in Point To Multipoint (PTM) bearer modes for a received push message;
configuring, for the push message, a transmission bearer type corresponding to the at least one mode; and
transmitting the push message through a PTM bearer network corresponding to the transmission bearer type;
wherein determining the at least one mode in the PTM bearer modes for the received push message comprises:
determining whether the push message comprises at least one PTM bearer indication identification (ID);
if the push message comprises at least one PTM bearer indication ID, determining whether a PTM bearer mode indicated by the PTM bearer indication ID is available; and
if the PTM bearer mode indicated by the PTM bearer at least one PTM bearer mode according to the PTM indication ID is bearer indication available, determining ID.

* * * * *